United States Patent

Harwood et al.

[15] 3,699,257

[45] Oct. 17, 1972

[54] AMPLIFIER CIRCUITS

[72] Inventors: Leopold Albert Harwood, Sommerville; Erwin Johann Wittmann, N. Plainfield, both of N.J.

[73] Assignee: RCA Corporation

[22] Filed: March 19, 1971

[21] Appl. No.: 126,348

Related U.S. Application Data

[62] Division of Ser. No. 822,887, May 8, 1969, Pat. No. 3,604,843.

[52] U.S. Cl.........178/69.5 CB, 178/5.4 SY, 307/239, 330/30 D

[51] Int. Cl...............................................H04n 9/46

[58] Field of Search.178/5.4 SY, 69.5 CB; 330/30 D, 330/69; 307/239–241

[56] References Cited

UNITED STATES PATENTS

| | | | |
|---|---|---|---|
| 2,837,595 | 6/1958 | Gruen | 178/69.5 |
| 3,541,466 | 11/1970 | Yee | 330/30 |
| 3,585,285 | 6/1971 | Rennick | 178/5.4 |

*Primary Examiner*—Robert L. Griffin
*Assistant Examiner*—Peter M. Pecori
*Attorney*—Eugene M. Whitacre

[57] ABSTRACT

Circuitry for selectively amplifying chrominance subcarrier signal frequencies and for separating oscillatory burst therefrom in response to keying pulses includes first, second, third and fourth transistors. The first and second transistors are connected as a first switchable differential amplifier with their emitter electrodes supplied composite chrominance and burst signals and the collector electrode of the second transistor coupled to a frequency selective network from which chrominance signals are to be taken. The third and fourth transistors are connected as a second switchable differential amplifier with their emitter electrodes supplied composite chrominance and burst signals and the collector electrode of the fourth transistor coupled to a frequency selective network from which burst signals are to be taken. The second and third transistors have their joined base electrodes connected to an operating bias, an the first and fourth transistors have the keying pulses applied to their joined base electrodes.

5 Claims, 1 Drawing Figure

PATENTED OCT 17 1972
3,699,257
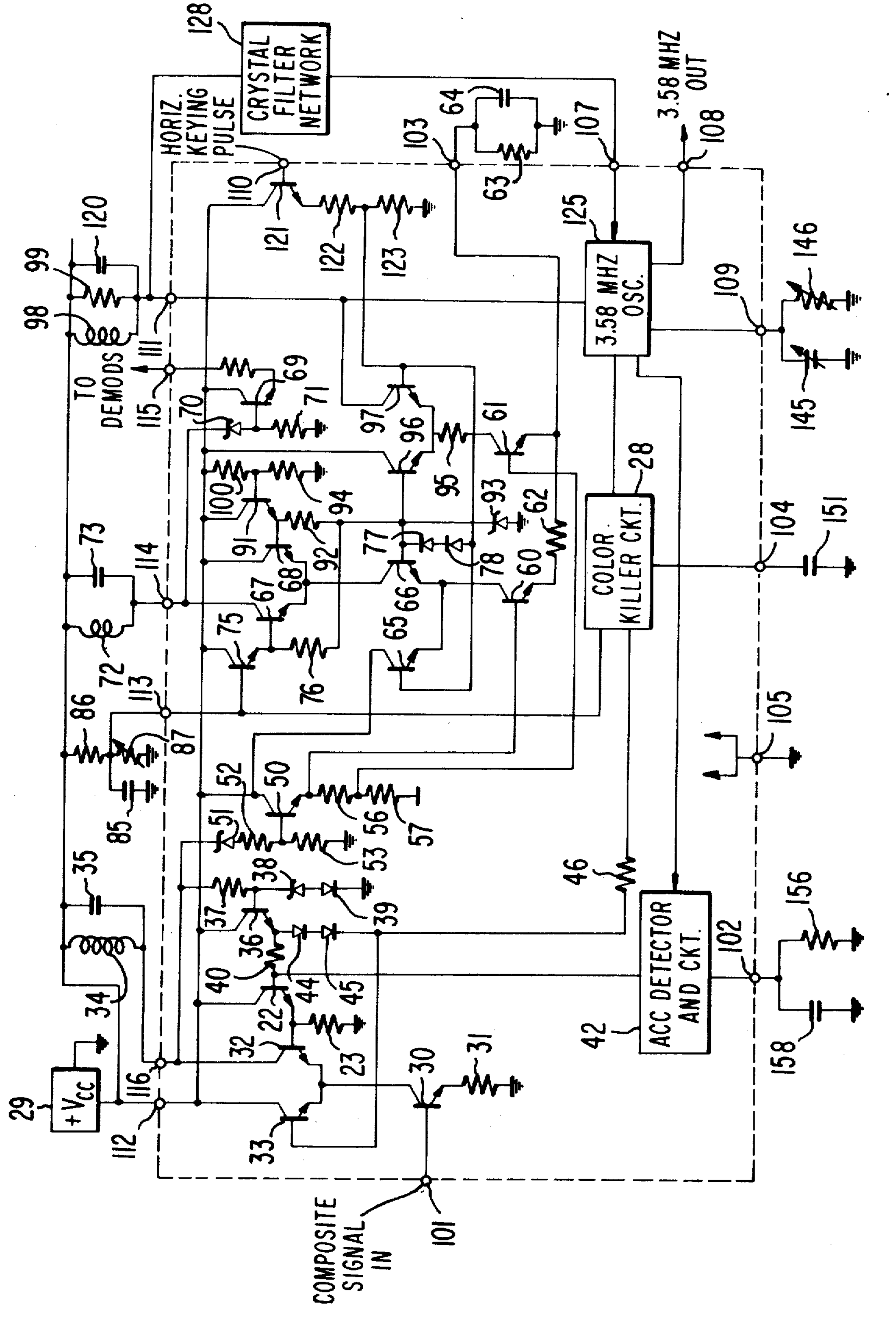

AMPLIFIER CIRCUITS

This is a division of Application Ser. No. 822,887, filed May 8, 1969 now U.S. Pat. No. 3,604,843.

This invention relates to amplifier circuits and, more particularly, to such circuits for use in a color television receiver, and especially adaptable for use with integrated circuit techniques.

A color television receiver includes amplifying circuitry for selectively responding to the chrominance subcarrier frequency signals transmitted with a composite signal during a color transmission. The chrominance subcarrier signal components contain amplitude information pertinent to the saturation of the requisite colors forming the display; and phase information pertinent to the hue of such colors.

In the United States the NTSC system as utilized at the transmitter generates such chrominance subcarrier components by a suppressed carrier modulation technique. An oscillatory burst signal is also transmitted along with the composite signal and used in the receiver for synchronizing a local oscillator. The oscillator signals are useful for properly demodulating such chrominance subcarrier components. Due to the standards specified in the present color system the amplitude of the chrominance signals may exceed the amplitude of the burst signal, which is desirably transmitted at a relatively constant level. Therefore the respective amplifying circuits for these signals must be designed to accommodate such anticipated variations.

Using prior art techniques, one may employ a separate chrominance amplifier biased at a quiescent level enabling it to accommodate the anticipated amplitude variations in the chrominance subcarrier signal components. In a similar manner a separate burst amplifier may also be provided which is biased to enable it to accommodate the burst signal with a predetermined amount of amplification.

However, in the integrated circuit environment one does not have the flexibility associated with discrete component technology. In view of prior art approaches, one would bias the chroma amplifier stage from a separate network isolated from still another separate biasing network for the burst amplifier stage. Accordingly, both stages, as biased, would be a.c. coupled to the source of composite signals and will exhibit different gain characteristics, determined by the biasing network and other feedback arrangements, to operate reliably in accordance with the above described signal variations.

However, in the integrated circuit environment, a.c. coupling is more difficult to implement than d.c. coupling. Separate biasing schemes may dictate the use of separate terminals for the burst and chrominance amplifiers. The conservation of terminals in the integrated circuit environment is a prime consideration as present techniques can only accommodate a given number of terminals for a given size chip.

It is therefore an object of the present invention to provide an improved chrominance amplifier for use in a color television receiver.

A further object of the present invention is to provide an improved chrominance amplifier circuit configuration for accommodating the anticipated variations in burst and chrominance subcarrier signal level.

Still a further object is to provide an improved chrominance amplifier particularly adaptable for use with integrated circuit techniques employing a single input and output terminal, while further providing a reliable biasing scheme.

According to an embodiment of the present invention, first and second transistors comprise the amplifier circuit. A voltage divider is coupled between the base electrode of the first transistor and a point of reference potential. A point on the voltage divider is also coupled to the base electrode of the second transistor. A common current return path for the first and second transistors is provided by coupling the emitter electrode of the second transistor to a resistor bypassed for a.c. by a capacitor. A third resistor coupled between the emitter electrodes of the first and second transistors is selected to have a magnitude sufficient to provide a d.c. voltage drop thereacross equal to the d.c. voltage drop between the base electrode of the first transistor and the base electrode of the second transistor, to provide with said common return path emitter network a common, linear d.c. biasing quiescent point for both transistors. The resistor coupled between the emitter electrodes serves to provide current degeneration for the first transistor enabling it to operate linearly, for example, with anticipated variations in the chrominance subcarrier components, while the second transistor has no emitter degeneration and operates at a higher gain level for the smaller amplitude burst signal.

These and other objects of the present invention will be made clearer if reference is made to the accompanying specification taken in conjunction with the accompanying FIGURE, which is a schematic diagram partially in block form of a chrominance processing integrated circuit chip employing an amplifier configuration according to this invention.

Referring to the FIGURE there is shown a schematic diagram partially in block form of an integrated circuit configuration capable of performing chrominance processing and including a chrominance amplifier configuration according to this invention.

A composite television signal is applied to terminal 101 coupled to the base electrode of a first chrominance amplifier stage including a transistor 30 having its emitter electrode returned to ground through a resistor 31. Transistor 30 forms part of a totem pole or cascode amplifier further comprising a transistor 32 having the emitter electrode coupled to the collector electrode of transistor 30. The collector electrode of transistor 32 is coupled to terminal 116 on the integrated circuit substrate.

A parallel resonant tank circuit comprising inductor 34 and capacitor 35 is coupled between terminal 116 and a source of operating potential 29 designated as $+V_{cc}$ and also coupled to the terminal 112 for supplying operating potential to the entire integrated circuit assembly. The parallel resonant tank circuit has a frequency bandpass characteristic within the chrominance subcarrier frequency range and serves to provide bandwidth selection for the amplifier. A biasing scheme for the cascode amplifier is referenced from a follower transistor 36 having the base electrode coupled to a voltage reference source comprising resistor 37 in series with a reference diode or zener diode 38 and a semiconductor diode 39 utilized for temperature stability. The junction between resistor 37 and the zener diode 38 is coupled to the base electrode of the follower transistor 36. The emitter electrode of the follower transistor 36 is coupled to the base electrode of a bias follower transistor 22 through a resistor 40.

Transistor 22 has the emitter electrode coupled to the base electrode of transistor 32 for providing operating bias thereto, and has an emitter shunt resistor 23 coupled to a point of reference potential such as ground. Transistor 32 is further current controlled and gain controlled by means of transistor 33 arranged in a follower configuration and having the emitter electrode connected directly to the emitter electrode of transistor 32. The base electrode of transistor 33 is referenced back to the emitter electrode of transistor 36 through the series diodes 44 and 45. The diodes 44 and 45 are maintained in forward conduction during a color transmission by means of a resistor 46 coupled between a color killer circuit 28 and the junction between the diodes and the base electrode of transistor 33. An ACC control voltage is applied between the junction of the base electrode of transistor 22 and resistor 40 by means of the ACC detector 42. The nature and operation of the ACC detector, as effecting gain control, of the above described totem pole configuration is more fully described in a copending application by L. A. Harwood entitled "AUTOMATIC CHROMA CONTROL CIRCUITRY" Ser. No. 822,951 now U.S. Pat. No. 3,604,842 filed concurrently herewith on May 8, 1969, and assigned to the same assignee.

The amplified chrominance signal appearing at terminal 116 is applied to the input or base electrode of transistor 50 via a zener diode 51 in series with a resistor 52. A resistor 53 is coupled between the base electrode of transistor 50 and ground and serves as a biasing element for transistor 50. Transistor 50, arranged in emitter follower configuration, has a collector electrode coupled to terminal 112 ($+V_{cc}$) and has an emitter electrode returned to ground through the series load comprising resistors 56 and 57.

Transistor 50 provides chroma drive and burst drive to a chrominance amplifier transistor 60 and a burst amplifier transistor 61. The base electrode of transistor 60 is coupled to the junction between emitter electrode of transistor 50 and resistor 56, and the base electrode of transistor 61 is coupled to the junction between resistors 56 and 57. The emitter electrode of transistor 60 is coupled to the emitter electrode of transistor 61 via a chrominance degenerating resistor 62. The junction between resistor 62 and the emitter electrode of transistor 61 is coupled to a terminal 103 on the integrated circuit assembly.

A parallel R–C network comprising a resistor 63 and a capacitor 64 is externally connected between terminal 103 and ground.

As will be described subsequently, the configuration comprising transistors 50, 60 and 61 offers many advantages for optimum amplification of burst signals and chrominance subcarrier components.

The chrominance amplifier transistor 60 has a collector electrode coupled to the junction between the emitter electrode of transistors 65 and 66 forming part of a switchable differential amplifier stage. The collector electrode of transistor 66 is coupled to the junction between the emitter electrode of transistors 67 and 68 also arranged in a differential amplifier configuration. Transistor 68 has the collector electrode coupled to terminal 112. Transistor 67 has the collector electrode coupled to the base electrode of a follower transistor 69 via a zener diode 70. A resistor 71 coupled to the base electrode of transistor 69 completes the bias and drive circuit. The junction between the collector electrode of transistor 67 and the cathode of the zener diode 70 is coupled to terminal 114. A parallel resonant circuit comprising inductor 72 and capacitor 73 is externally connected between the integrated circuit assembly at terminal 114 and the $+V_{cc}$ supply. This selective network is responsive to chrominance frequencies and functions to provide further selectivity of the chrominance signals as applied to the base electrode of transistor 60. A controllable biasing network for transistor 67 employs a follower transistor 75 having the emitter electrode coupled to the base electrode of transistor 67. Bias for transistor 66 is also obtained by coupling the emitter electrode of transistor 75 to the base electrode of transistor 66 via resistor 76. The base electrode of transistor 65 is coupled to the base electrode of transistor 66 through the series combination of diodes 77 and 78. The base electrode of the follower transistor 75 is coupled to terminal 113 to which an external voltage divider comprising resistors 86 and 87 is also coupled. Resistors 86 and 87 are selected to provide temperature tracking with the voltage divider comprising the on-chip resistors 94 and 100 and used for biasing the base electrode of the bias follower transistor 91. A capacitor 85 is connected between terminal 113 and a point of reference potential and serves as a decoupling element. A ground return path for the base electrode of transistor 75 is provided through a controllable impedance associated with the color killer circuit 28. A more detailed description of the bias control may be obtained by reference to a copending application entitled "OSCILLATOR CIRCUITS" Ser. No. 823,066 now U.S. Pat. No. 3,617,622 by L. A. Harwood filed concurrently herewith on May 8, 1969, and assigned to the same assignee.

Reference biasing for transistor 68 is supplied by the follower biasing transistor 91 having the emitter electrode directly coupled to the base electrode of transistor 63. A resistor 92 is coupled between the emitter electrode of transistor 91 and the base electrode of transistor 66. A reference potential for the base electrode of transistor 66 is supplied by zener diode 73 coupled between the base electrode ad a point of reference potential. The above mentioned stages including transistor 60 and the switchable differential amplifier serve to provide chrominance amplification as will be described subsequently.

The burst amplification path includes the burst driver amplifier 61 having the collector electrode thereof coupled through a current limiting resistor 95 to the junction between the emitter electrodes of a differential amplifier arrangement comprising transistors 96 and 97. The base electrode of the follower transistor 96 receives an operating bias from the connection thereto of the cathode of the aforementioned zener diode 93. Transistor 97 has the collector electrode coupled to terminal 111 on the integrated circuit chip. An external parallel resonant circuit comprises inductor 98, resistor 99 and capacitor 120 and is selected to provide a fairly broad frequency response about 3 MHz and is coupled between terminal 111 and the $+V_{cc}$ supply. The resonant circuit is used as part of the burst separator for burst selectivity, and for further specifying the frequency and phase characteristics determinative of the locking ability of the chrome subcarrier oscillator 125.

The oscillator 125 is an injection locked type and utilizes a crystal filter network 128 externally connected between terminal 111 and an oscillator input terminal 107, for providing a.c. feedback and for burst injection.

The oscillator 125 includes a limiter stage which operates with the network coupled to terminal 109 comprising capacitor 145 and resistor 146, to provide average detection for the color killer circuit 28, while further providing ACC and killer threshold adjustments.

The ACC detector 42, controls the gain of the chrominance amplifier including transistors 30 and 32, according to peak variations of the oscillator signal amplitude. A time constant for ACC is provided by the capacitor 157 and resistor 156 coupled to terminal 102.

The color killer circuit 28 has a killer time constant determined by capacitor 151 coupled to terminal 104. The color killer circuit 28 serves to disable the chrominance amplifier including transistors 67 and 68 during a monochrome transmission. The exact nature and operating characteristics of the oscillator circuit 125 and the color killer and ACC circuits are more fully described in the above noted concurrently filed copending applications entitled "OSCILLATOR CIRCUITS" and "AUTOMATIC CHROMA CONTROL CIRCUITS".

A keyed transistor 121 has a collector electrode coupled to the $+V_{cc}$ bus (terminal 112) and an emitter electrode returned to ground through the series combination of resistors 122 and 123. The junction between resistor 122 and resistor 123 is coupled respectively to the base electrodes of transistors 65 and 97. The base electrode of transistor 121 is coupled to terminal 110 of the integrated circuit chip. In operation a horizontal keying pulse of a positive polarity is applied to terminal 110 as will be described subsequently.

The operation of the integrated circuit assembly containing the above described components connected in the above described configuration will now be explained in greater detail.

The composite signal as applied to terminal 101 is amplified by the cascode combination of transistors 30 and 32 and is confined to a predetermined bandwidth at terminal 116 due to the "Q" of the resonant circuit comprising inductor 34 and capacitor 35. The amplified signal is applied to the base electrode of transistor 50 via the zener diode 51 and resistor 52. The avalanche or the zener diode 51 together with resistors 52 and 53 serves to maintain a relatively constant d.c. bias for transistor 5 as described in greater detail in the above noted copending application entitled "AUTOMATIC CHROMA CONTROL CIRCUITS".

Transistor 50 thus biased is arranged in an emitter follower configuration having a split emitter load for driving the chrominance amplifier stage 60 and a burst amplifier stage 61. As can be seen, the magnitude of the signal applied to the base electrode of the chrominance amplifier 60 is slightly greater than the magnitude applied to the base electrode of the burst amplifier 61. This is so as the base electrode of the chrominance amplifier 60 is coupled directly to the junction between the emitter electrode of transistor 50 and resistor 56, while the base electrode of transistor 61 is coupled to the junction between resistors 56 and 57. The arrangement shown according to this invention offers the following advantages and operates as follows.

The standards for a color television transmission are such that the amplitude of the chrominance signal may exceed the amplitude of the burst signal. The respective chrominance and burst amplifiers must be capable of handling the maximum levels of the particular signal assigned thereto without distortion. This capability is provided for as follows.

The d.c. voltage drop across the emitter resistor 62 in series with the emitter electrode of the chrominance amplifier 60 is approximately equal to the d.c. voltage drop across the resistor 56 in the emitter electrode of transistor 50. Resistor 62 affords negative current feedback for the chrominance amplifier 60, while both stages 60 and 61 have a common return path through terminal 103 and resistor 63 to ground.

The d.c. voltage at terminal 103 is relatively constant as bypassed by capacitor 64. However, the base electrode of transistor 61 is d.c. coupled to a lower potential point than is the base electrode of transistor 60. Both stages are biased at a d.c. level to provide linear operation while further having only one external output connection (terminal 103). Therefore amplifiers 60 and 61 have a common input terminal across resistor 56 and a common path for emitter current resulting in a common output terminal 103.

The d.c. biasing advantages are available with the additional fact that the degree of signal degeneration in the chroma stage can be set independent of the gain of the burst amplifier, while further maintaining both stages at a relatively constant d.c. bias. Due to the emitter degeneration afforded by resistor 62 the chrominance amplifier 60 can handle larger amplitude conditions of the chrominance signals without distortion.

Transistor 61 can handle the lower amplitude burst signal at a higher gain level without distorting the burst signal available at the back porch of the horizontal synchronizing pulse. Furthermore with the simple biasing arrangement shown, the chrominance amplifier 60 operates linearly for chrominance signals at their anticipated levels while the burst amplifier, as biased, would distort such signals because of the lack of degeneration, but will operate linearly with the lower amplitude burst signal. The distortion which the amplifier 61 may introduce to higher level chrominance signals, during the horizontal line interval, will not couple back and effect or distort the chrominance output because of the isolation provided between the driving circuits for amplifiers 60 and 61 due to resistor 56.

As is known in the prior art, it is preferable to blank the chroma channel during the burst period to prevent spurious products from being developed by the demodulators because of the coupling thereto of the burst signal. The technique is normally referred to as burst elimination or burst blanking. The chrominance amplifier is preferably energized during the major portion of the line interval and is blanked during burst retrieval occurring during the horizontal retrace interval. To accomplish this, a horizontal retrace pulse is utilized during a horizontal interval encompassing the time in which burst is present on the back porch during the horizontal synchronizing pulse.

A positive polarity horizontal pulse is applied to the base electrode of transistor 121 causing the following operations to occur.

The emitter of transistor 121 goes positive during the pulse, thus turning on transistor 97 permitting the burst signal as applied to the base electrode of transistor 61, to be selectively amplified by transistors 61 and 97 in conjunction with the collector load comprising the parallel resonant circuit of inductor 98, capacitor 120 and the damping resistor 99. Hence during the positive pulse the amplified burst appears at terminal 111. The tank circuit further serves to remove signal components at the horizontal retrace pulse frequencies from affecting the burst output. Similarly, during the burst interval the base electrode of transistor 65 which is coupled to the emitter electrode of transistor 121 also goes positive.

The base potential of transistor 65 exceeds the base potential of transistor 66 by at least $2V_{be}$ due to the drops across diodes 77 and 78. The diodes 77 and 78 also limit the amplitude of the keying pulse at the base of transistor 97 to limit the collector swing. The emitter electrode of transistor 65 follows the base and hence goes positive. Transistor 66 is cut-off due to the positive rise in the emitter voltage as the emitter electrode is at least $1V_{be}$ above the base electrode. This disabling of transistor 66 disables the chroma path and hence there is no signal that can be applied to terminal 114, which is the chrominance output terminal, during the burst interval. The operation of the circuit during the line scan is as follows.

The absence of the horizontal retrace pulse causes transistor 121 to be non-conducting which effectively applies ground potential to the base electrode of transistor 97. Transistor 97 is therefore cut-off due to the positive potential at the emitter electrode determined by the conduction of transistor 96 which is biased on, via transistor 91, resistor 92 and the zener diode 93. In this manner there is no amplification path to terminal 111 for any chrominance signals applied to the base electrode of the burst amplifier transistor 61. In a similar manner transistor 65 is also cut-off as having its base electrode effectively at ground while its emitter electrode is at a positive potential due to the conduction of transistor 66 biased in a similar manner as described for transistor 96. Chrominance signals as applied to the base electrode of transistor 60 are amplified by transistors 60 and 66 and drive the common emitter connection of transistors 67 and 68. This action enables the chrominance signal to be effectively amplified at terminal 114 and hence coupled to the base electrode of transistor 69 via the zener diode 70. Amplified chrominance signals are thereby available for application to appropriate demodulating circuitry, not shown, at terminal 115 which is coupled to the emitter electrode of transistor 69.

What is claimed is:

1. A circuit for use in a color television receiver of the type employing chrominance processing circuitry for selectively amplifying chrominance subcarrier signal frequencies including an oscillatory burst transmitted with a composite television signal during a color transmission, comprising:
   a. a first switchable differential amplifier including first and second transistors having their emitter electrodes coupled together,
   b. means including a first selective network coupled to said collector electrode of said second transistor for providing selectivity to signals at said chrominance subcarrier frequencies,
   c. a second switchable differential amplifier including third and fourth transistors having their emitter electrodes coupled together,
   d. means including a second selective network coupled to said collector electrode of said fourth transistor for providing frequency selectivity to said oscillatory burst signal,
   e. means coupled to said emitter electrode connection of said first and second differential amplifiers for applying composite signals thereto,
   f. a common biasing network coupled to the base electrodes of said second and third transistors for supplying operating bias to said first and second switchable differential amplifiers, for causing said second and third transistors to be biased on while said first and fourth transistors, are biased off,
   g. means coupled to the base electrodes of said first and fourth transistors for alternatively switching between said first and second differential amplifiers to cause said second transistor of said first differential amplifier to be switched off during the presence of said oscillatory burst signal and said fourth transistor to be switched on whereby said oscillatory burst signal is amplified by said fourth transistor while said burst signal is blocked by said second transistor.

2. A circuit for use in a color television receiver of the type employing chrominance processing circuitry for selectively amplifying chrominance subcarrier signal frequencies, including an oscillatory burst signal transitted with a composite television signal during a color transmission, comprising:
   a. a first switchable differential amplifier having first and second transistors, said first and second transistors having their emitter electrodes connected together,
   b. a second switchable differential amplifier having third and fourth transistors, said third and fourth transistors having their emitter electrodes connected together,
   c. means coupled to said emitter electrode connections of said first and second differential amplifiers for applying said composite television signal thereto,
   d. biasing means coupled to the base electrodes of said first and third transistors for biasing the same in a conductive state, said biasing means further serving via said emitter connections to reverse bias said second and fourth transistors,
   e. first output means coupled to the collector electrode of said first transistor responsive to said chrominance subcarrier frequencies, f. second output means coupled to the collector electrode of said fourth transistor responsive to said oscillatory burst signal, g. means coupled to said base electrodes of said second and fourth transistors for switching the same into conduction during the presence of said oscillatory burst signal to cause said first and third transistors to cease conduction via said emitter electrode connections, whereby said burst is amplified by said fourth transistor while said burst is blocked by said first transistor.

3. The circuit according to claim 2 wherein said means coupled to the base electrodes of said second and fourth transistors comprises:

a. an emitter follower transistor amplifier having an output emitter electrode coupled to said base electrodes of said second and fourth transistors, and an input base electrode coupled to a source of keying pulses.

4. The circuit according to claim 2 further comprising:

a. at least one unidirectional current conducting device coupled between the base electrode of said first transistor and the base electrode of said second transistor and poled for easy current conduction therebetween.

5. The circuit according to claim 2 wherein said biasing means includes a Zener diode.

* * * * *